Aug. 1, 1950     C. B. ZIMMERMAN     2,517,270
AWNING OPERATOR
Filed June 27, 1947     3 Sheets-Sheet 1
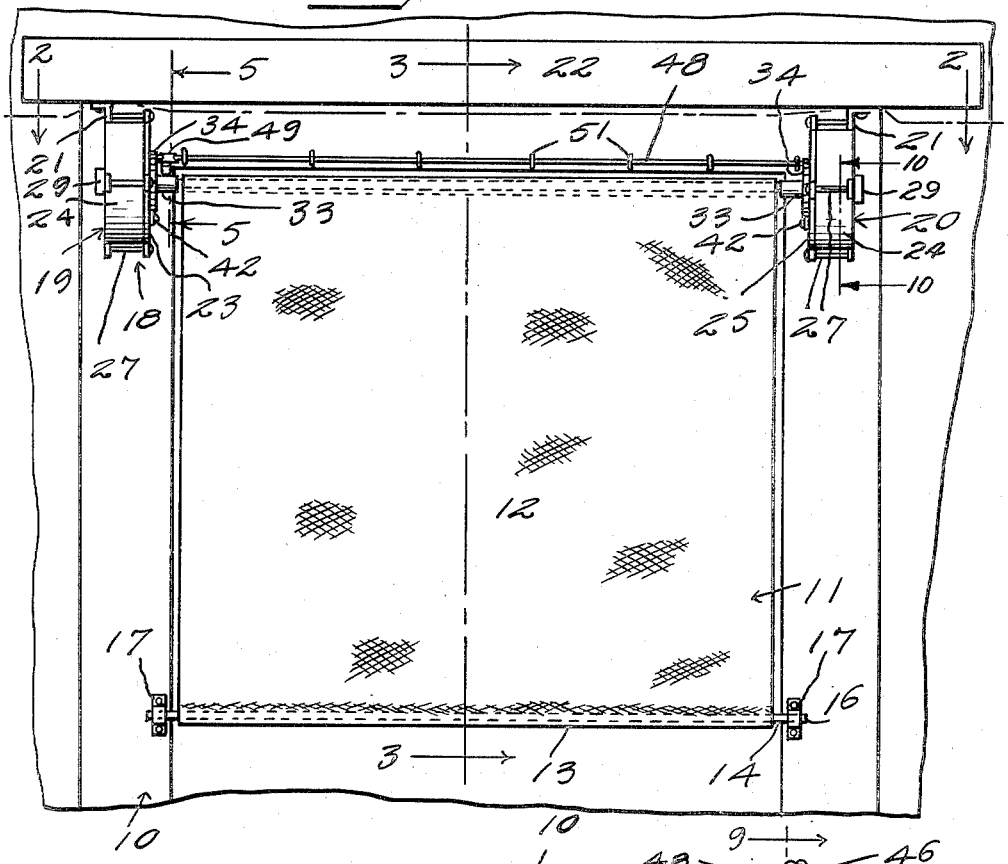
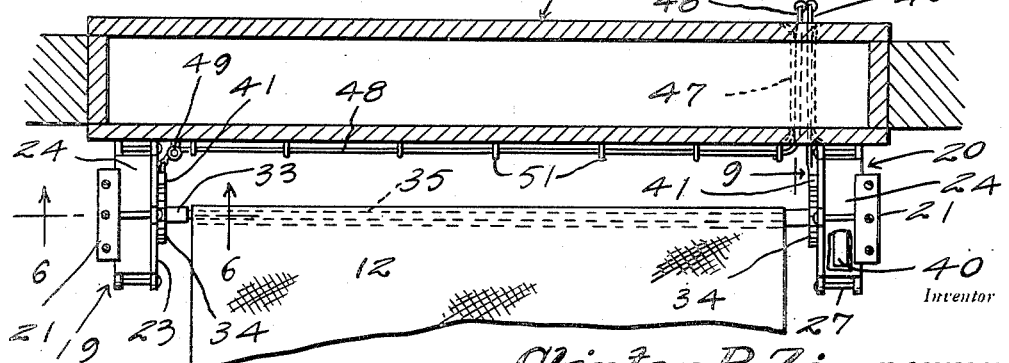
Inventor
Clinton B. Zimmerman
By Randolph & Beavers
Attorneys

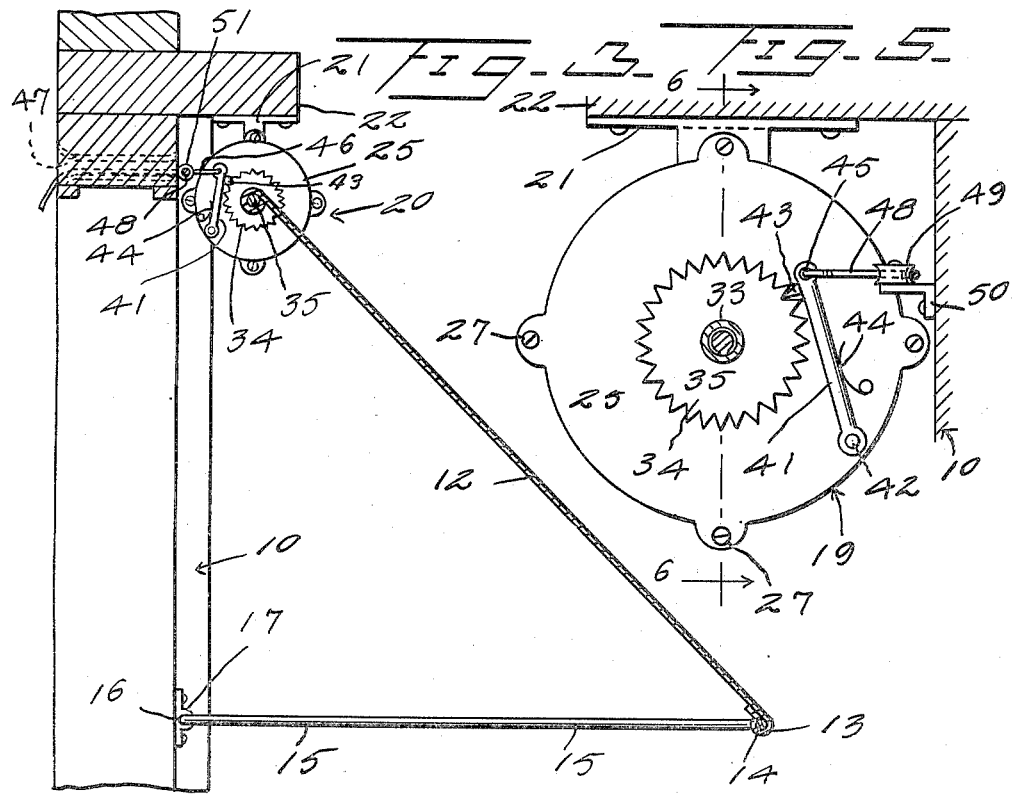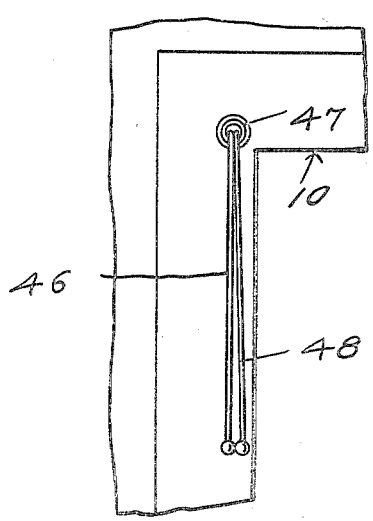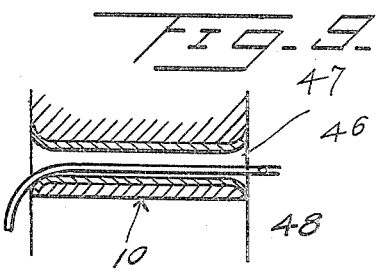

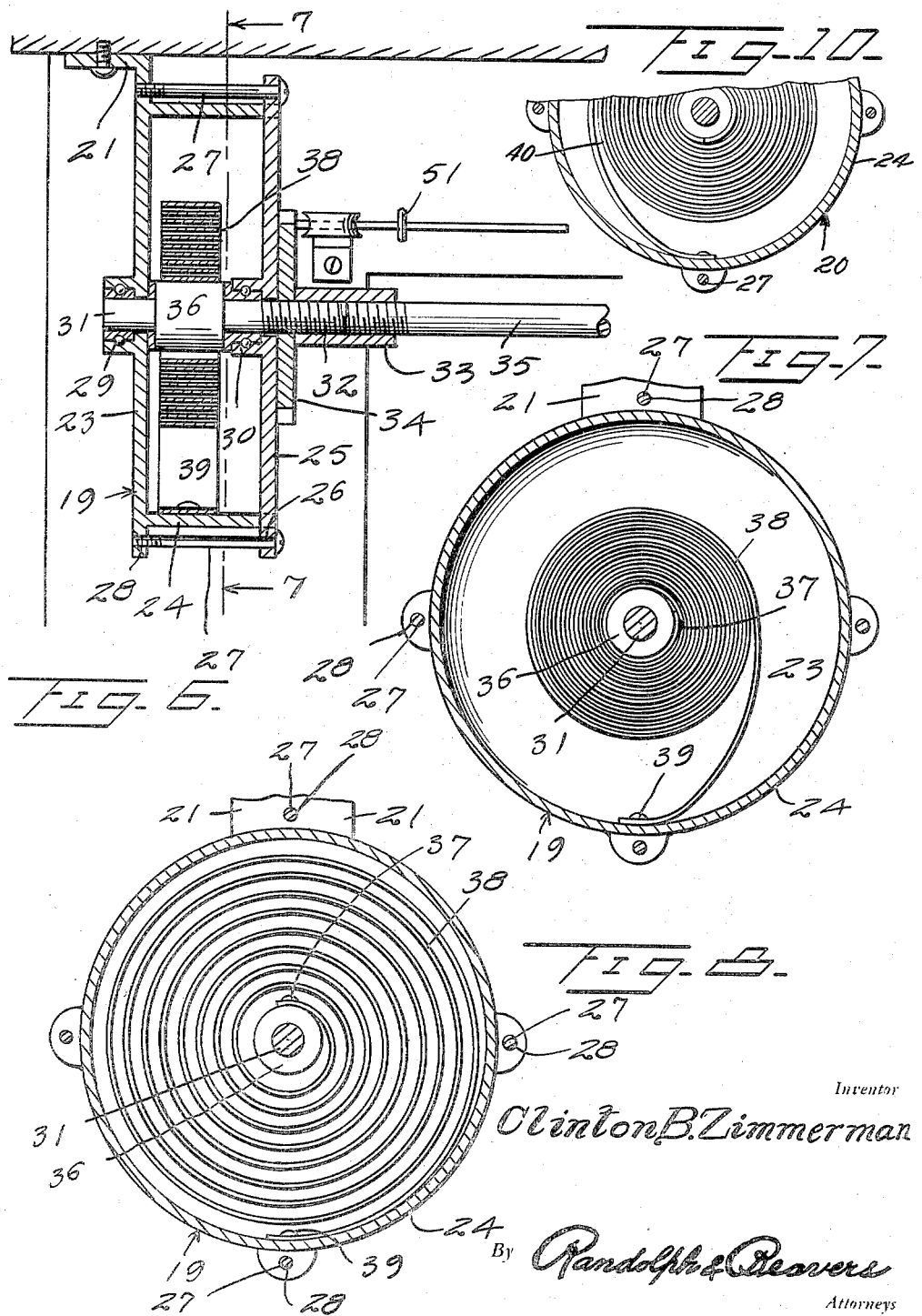

Patented Aug. 1, 1950

2,517,270

UNITED STATES PATENT OFFICE 2,517,270

AWNING OPERATOR

Clinton B. Zimmerman, Union City, Tenn.

Application June 27, 1947, Serial No. 757,589

5 Claims. (Cl. 160—72)

This invention relates to an operator of extremely simple construction provided with power means for raising or lowering an awning connected thereto.

More particularly, it is an object of the present invention to provide an awning operator of extremely simple construction which will function to effectively raise or lower an awning and wherein the power means thereof will function additionally as cushioning means for checking the movement of the awning as it approaches either a fully raised or fully lowered position.

Still another object of the invention is to provide an awning operator having separate power means for raising and lowering the awning, and which latter power means will function in conjunction with the gravity pull on the awning and for providing the initial impetus to start the awning on its movement toward a lowered position.

Still a further object of the invention is to provide an awning operator of extremely simple construction which may be quickly and easily attached to conventional awnings already in use and which will function in conjunction with conventional mounting frame portions of an awning.

Still another object of the invention is to provide an awning operator having manually controlled means for releasing the operator to enable operation thereof for movement of the awning from either a raised to a lowered position or vice versa.

Various other objects and advantages of the invention will hereinafter become more fully apparent from the following description of the drawings, illustrating a preferred embodiment thereof, and wherein:

Figure 1 is a front elevational view showing the operator applied to a conventional window awning;

Figure 2 is a horizontal sectional view taken substantially along a plane as indicated by the line 2—2 of Figure 1;

Figure 3 is a vertical sectional view taken substantially along a plane as indicated by the line 3—3 of Figure 1;

Figure 4 is a view looking from left to right of Figure 3;

Figure 5 is an enlarged vertical sectional view taken substantially along a plane as indicated by the line 5—5 of Figure 1;

Figure 6 is a vertical sectional view taken substantially along a plane as indicated by the line 6—6 of Figure 5, and on an enlarged scale;

Figure 7 is a vertical sectional view taken substantially along a plane as indicated by the line 7—7 of Figure 6;

Figure 8 is a view similar to Figure 7, but showing the spring thereof unwound;

Figure 9 is a sectional view taken substantially along a plane as indicated by the line 9—9 of Figure 2, and Figure 10 is an enlarged fragmentary sectional view taken substantially along a plane as indicated by the line 10—10 of Figure 1.

Referring more specifically to the drawings, for the purpose of illustrating one preferred application and use of the invention, hereinafter to be described, the numeral 10 designates generally the upper portion of a window frame, on the outer side of which is mounted an awning, designated generally 11 and including a strip of awning fabric 12, the bottom edge of which is turned back upon itself to form an elongated loop 13 which extends the width thereof, and in which the intermediate or bight portion of a substantially U-shaped awning frame member 14 is loosely disposed. The U-shaped frame member 14 is provided with corresponding legs 15, which extend inwardly from the ends of said intermediate portion toward the side rails of the window frame 10 and each of which terminates in an outturned terminal portion 16 which is journalled in a bearing 17, one of which bearings is fastened to the outer side of each side rail of the frame 10. The parts previously described are of conventional construction and the frame 14 is adapted to swing on the bearings 17 as its pivot when the awning 11 is moving to or from a raised or lowered position; said awning being shown in Figures 1 and 3 in a lowered position.

Whereas it is generally conventional to secure the upper edge of the awning material 12 to the top rail of the outer side of the window frame above the window opening and to provide pull cords for raising the awning, the present invention provides an awning operator, designated generally 18, to a portion of which the upper end or edge of the awning material 12 is securely fastened.

The awning operator 18 includes two housing members 19 and 20 provided with corresponding brackets 21 by means of which said housing members may be attached to the outer side of the window frame 10, on opposite sides of the opening thereof, or to the underside of an overhanging ledge 22, as illustrated in the drawings, for fixedly supporting the awning operator 18 relatively to the upper portion and outer side of the window frame 10.

As best illustrated in Figure 6, each of the housing members 19 and 20 includes an outer wall 23 provided with an inwardly projecting annular flange 24, which is suitably secured thereto or formed integral therewith, and a demountable inner wall 25, which bears against the inner edge of the flange 24, when in an applied position, as seen in Figure 6. The walls 23 and 25 are provided with ears extending to beyond the flange 24 and said portion of the wall 25 is provided with openings 26 for loosely receiving bolts 27, the headed ends of which bear against the outer side of the wall 25 and the threaded shank ends of which engage threaded openings 28 in said ears of the wall 23. The walls 23 and 25 are provided with complementary, centrally disposed antifriction bearing openings 29 and 30, respectively, which are disposed, respectively, externally and internally of the housings or on corresponding sides of said walls.

A shaft 31 extends through and is journalled in the bearings 29 and 30 of each housing, and said shafts are provided with inner threaded ends 32, which project inwardly a short distance from the inner sides of said housings, each of which is adapted to threadedly engage an end of an internally threaded sleeve 33. The threaded portions 32 engage the adjacent ends of the sleeves 33 and said adjacent ends are provided with fixedly connected ratchet wheels 34 which are disposed adjacent the inner sides of said housings 19 and 20. The adjacent ends of the sleeves 33 engage the threaded ends of a rod or shaft 35 which extends therebetween and around which the upper edge of the awning material 12 is wound and fixedly secured, in any suitable manner, as best seen in Figure 3. It will thus be readily apparent that the shafts 31 of the two housings 19 and 20 are connected in keyed relationship to one another by the shaft or rod 35, but may be readily detached from one another by unscrewing said rod from either of the coupling sleeves 33, after first demounting the housing, adjacent which said sleeve or coupling is disposed from the window frame or ledge 22.

As best seen in Figures 6, 7 and 8, the shaft 31 of the housing 19 has a hub 36, fixed thereto and disposed between the bearings 29 and 30 and to which is secured by a fastening 37, the inner end of a coiled, clock-type spring 38, which is wound therearound from its inner to its outer end in a clockwise direction, looking toward the inner edge of said spring, or as seen in Figures 7 and 8. The outer end of the spring 38 is anchored by a fastening 39 to a portion of the housing flange 24. The spring 38 is loaded when wound, as seen in Figure 7, so that said spring in exerting its normal tendency to unwind will revolve the drum 36 and shaft 31, thereby turning the rod or shaft 35 and the other shaft 31 in a clockwise direction, looking from right to left of Figure 1, or as seen in Figures 7 and 8, for winding the awning material 12 on said rod 35 to raise the awning 11 and to cause the frame 14 to swing upwardly and to a position substantially against and parallel to the outer side of the window frame 10.

The shaft 31 of the housing 20 is provided with a similar hub, fixed thereto and to which is secured the inner end of a similar but weaker coiled spring 40, partially illustrated in Figures 2 and 10, which is wound thereon in the opposite direction and which is fixed at its outer end to the flange 24 of said housing 20, and so that said spring 40 tends to rotate the shafts 31 and 35 in the opposite direction to the direction of rotation in response to the unwinding of the spring 38 and for unwinding the awning material 12 from the rod or shaft 35. The spring 40 is illustrated in a wound condition in Figure 10, as it would appear when the awning frame 14 is raised and when the spring 38 is unwound, as seen in Figure 8.

As best illustrated in Figures 4 and 5, the inner walls 25 of each of the housings 19 and 20, mount a lever 41 which is pivotally supported relatively thereto, adjacent one end thereof by a pivot 42 and which is provided with a laterally projecting pawl 43, adjacent its opposite, free end for engagement between the teeth of the ratchet wheel 34, which is disposed on the outer side of said wall 25. Each of the walls 25 has a leaf spring 44 anchored thereto at one end thereof and which bears against the lever 41, mounted by said wall, for urging the pawl 43 of said lever 41 into engagement with the ratchet wheel teeth. Each of the levers 41 is provided at its upper end with an eye 45, for connection with a flexible member. The lever 41, carried by the housing 20, has a flexible member or cord 46 connected to its eye 45 and extending rearwardly therefrom and through an opening 47 in the top rail of the window frame 10. One end of a flexible member 48 is fastened to the eye 45 of the lever of housing 19 and extends rearwardly therefrom and is trained around a pulley 49 supported by a bracket 50, secured to the top rail of the window frame 10 and extends longitudinally across the outer side of said top rail of the window frame and loosely through a plurality of guide eyes 51 which project outwardly therefrom, and inwardly through the bore 47, as best seen in Figures 2 and 9. Accordingly, it will be readily apparent that the two lines 46 and 48 may be grasped simultaneously from the inner side of the window frame 10 and by exerting a pull thereon, both of the pawls 43 will be retracted out of engagement with the ratchet wheel 34 by swinging movement of the levers 41 against the action of the springs 44 and so as to release the shafts 31 and shaft or rod 35 for rotation as a unit.

Assuming that the awning 11 is in a lowered position, as seen in Figures 1 and 3, when thus disposed, the stronger spring 38, contained within the housing 19, will be fully wound, as illustrated in Figure 7, and the weaker spring 40 will be unwound. Accordingly, if a pull is exerted on the two flexible members 46 and 48 for retracting the pawls 43 out of engagement with the ratchet wheels 34, as previously described, the fully wound stronger spring 38 will be thereby released and permitted to unwind, thus turning the hub 36 and shaft 31, to which it is connected in a clockwise direction, as seen in Figures 7 and 8, for turning the rod 35 and other shaft 31 in the same direction. This will cause the flexible awning material 12 to be wound onto the rod or shaft 35 and in winding thereon, the material 12 will be drawn upwardly to swing the awning frame 14 upwardly on its pivots 16, 17. As the frame 14 moves upwardly from its horizontal position of Figures 1 and 3, the amount of power required to raise said frame will be diminished due to reduction in the leverage afforded thereby, so that as the spring 38 unwinds and loses strength, the amount of power required to be exerted thereby will likewise be diminished. The weaker spring 40 will be rewound while the awning 11 is thus being raised, but the effect thereof will not become substantial until the awning has practically reached a fully raised position and the impetus of the power afforded by the stronger spring 38 will be sufficient to carry the awning to a fully raised position and with the resistance of the spring 40 functioning as a check or brake on the shafts 31 and 35, as the awning approaches its fully raised position and when the spring 38 has substantially completed its unwinding movement. The cords 46 and 48 are then released to permit the pawls 43 to engage the ratchet wheels 34 for latching the awning in a raised position.

To lower the awning 11, the pawls 43 are again retracted from engagement with the ratchet wheels 34 in the manner as previously described, permitting the wound weaker spring 40 to exert an initial impetus upon the shafts 31 and 35 for turning them in a counterclockwise direction, as seen in Figures 7 and 8, for unwinding the awning material 12 from the rod or shaft 35. The awning material 12 is sufficiently stiff so that it will start the frame 14 in its outward and downward swinging movement and will augment the gravity pull on the frame 14 and that exerted by the awning material 12 during the initial stage of movement of the awning 11 toward a lowered position, and as the power exerted by said weaker spring 40 diminishes, the initial impetus afforded thereby plus the gravitational pull exerted by the awning material 12 and frame 14, will be sufficient to carry the awning 11 back to its fully lowered position of Figures 1 and 3, and with the stronger spring 38 being rewound during this movement from its position of Figure 8 to its position of Figure 7. As the awning 11 approaches a fully lowered position, the substantially rewound spring 38 will act as a check to cushion the final downward movement thereof, and as soon as the awning is in its position of Figures 1 and 3, the cords 46 and 48 are released to permit the pawls 43 to engage the ratchet wheels 34 for latching the shafts 31 and 35 against rotation.

Various modifications and changes are contemplated and may obviously be resorted to, without departing from the spirit or scope of the invention as hereinafter defined by the appended claims.

I claim as my invention:

1. In an awning operator, in combination with an awning including a substantially U-shaped frame adapted to be pivotally connected to the surface adjacent which the awning is disposed, and a length of awning material having a bottom edge portion fixed to the intermediate portion of said frame, said operator including spaced housing members mounted above the pivots of the awning frame, a shaft extending therebetween and journalled therein, the opposite, upper end of the awning material being secured to said shaft, a strong coiled spring disposed in one of said housings and having its inner end anchored to the shaft and its outer end fixed to a portion of the housing for rotating the shaft in one direction for winding said awning material thereon, and a weaker coiled spring contained in the other housing and having its inner end fixed to the shaft and wound therearound in the opposite direction and anchored at its outer end to said last mentioned housing for rotating the shaft in the opposite direction for unwinding the awning material therefrom.

2. An awning operator as in claim 1, normally engaged latch means for holding said shaft against rotation, and means manually operable from a position remote from said latch means for disengagement of the latch means, said shaft being formed of sections including a short shaft section journalled in each of said housings, a longer, intermediate shaft section disposed therebetween and on which said awning material is secured and wound, and coupling means for connecting the adjacent ends of the first mentioned and intermediate shaft sections, at least one of said coupling means being connected to a part of said latch means and forming the connection of the latch means and shaft.

3. In a winding and unwinding mechanism for a flexible member, a shaft to which one end of the flexible member is securable and on which said flexible member is windable, means for journaling said shaft adjacent its ends, power means of different strengths respectively associated with the two shaft ends and anchored to the journal means thereof for rotating the shaft in different directions for winding and unwinding the material relatively thereto, and manually releasable, normally engaged latch means for retaining the shaft against rotation at either extremity of its movement in response to the power means.

4. A winding and unwinding mechanism comprising a shaft to which one end of a flexible material to be wound and unwound is securable, means for journaling the ends of said shaft, a spring motor anchored to each of said journal means and connected to the shaft and journalled thereby, said spring motors being of different strengths and oppositely acting upon the shaft and tending to turn it in opposite directions, and manually releasable, normally engaged latch means for retaining the shaft against rotation in either direction when the latch means is in an engaged position.

5. A winding and unwinding mechanism as in claim 4, said shaft being formed of end sections connected to said spring motor means and an intermediate section fastened to the material, coupling means for detachably coupling the adjacent ends of said end sections to the ends of the intermediate section, and a portion of said latch means being connected to at least one of the coupling means for connecting the latch means to the shaft.

CLINTON B. ZIMMERMAN.

REFERENCES CITED

The following references are of record in the file of this patent:

UNITED STATES PATENTS

| Number | Name | Date |
| --- | --- | --- |
| 15,258 | Stephens | July 1, 1856 |
| 1,567,095 | Anderson | Dec. 29, 1925 |
| 1,777,739 | Shaw | Oct. 7, 1930 |